United States Patent [19]

Asghar et al.

[11] Patent Number: 5,615,139
[45] Date of Patent: Mar. 25, 1997

[54] APPARATUS AND METHOD FOR SYNTHESIZING A SINUSOIDAL SIGNAL

[75] Inventors: Safdar M. Asghar; Mark A. Ireton, both of Austin, Tex.

[73] Assignee: Advanced Micro Devices, Inc., Sunnyvale, Calif.

[21] Appl. No.: 217,309

[22] Filed: Mar. 23, 1994

[51] Int. Cl.⁶ ....................................................... G06F 1/02
[52] U.S. Cl. ............................................................. 364/721
[58] Field of Search ................................... 364/718, 719, 364/720, 721, 722, 729

[56] References Cited

U.S. PATENT DOCUMENTS

| | | | |
|---|---|---|---|
| 4,905,177 | 2/1990 | Weave, Jr. et al. | 364/721 |
| 5,113,361 | 5/1992 | Damerow et al. | 364/721 |
| 5,187,677 | 2/1993 | Kovalick | 364/721 |
| 5,276,633 | 1/1994 | Fox et al. | 364/721 |
| 5,321,642 | 6/1994 | Goldberg | 364/721 |

*Primary Examiner*—Chuong D. Ngo
*Attorney, Agent, or Firm*—Jefferson Perkins

[57] ABSTRACT

An apparatus and method for synthesizing a sinusoidal signal generated from a plurality of sample values taken at sample times in succeeding sample intervals. The signal is defined by a parameter which varies by a step value during predetermined sample intervals when the parameter changes from a first value to a second value. The apparatus includes a first logic unit for iteratively treating an initial step value to generate succeeding samples of the step value and a next step value. The next step value is the step value in a next-succeeding sample interval. A second logic unit is included for iteratively generating a next parameter value which is the parameter value during the next-succeeding sample interval. The second logic unit receives succeeding samples of the step value and iteratively generates succeeding samples of an interim parameter value and succeeding samples of a derivative interim parameter value. The interim parameter value is the parameter value intermediate a current parameter value in a current sample interval and a next parameter value during a next-succeeding sample interval. The second logic unit iteratively treats the succeeding samples of the interim parameter value and the derivative interim parameter value to generate the next parameter value. The second logic unit continues iterative generating of the next parameter value until the end of a time interval or until the particular parameter value substantially equals the second parameter value.

25 Claims, 6 Drawing Sheets

APPARATUS AND METHOD FOR SYNTHESIZING A SINUSOIDAL SIGNAL

BACKGROUND OF THE INVENTION

The invention relates to an apparatus and method for generating sinusoidal signals that are modulated under control of a signal which is conditioned to perform a certain task.

Specifically, the invention relates to an apparatus and method for generating sinusoidal signals which are variable in a particular parameter, such as frequency, from one time frame to another time frame, or from one sampling interval to another sampling interval. A representative application of the present invention is generation of a sinusoidal signal which is appropriate as a pitch component upon vocal tract information which may be imposed to reproduce speech information.

Earlier sinusoidal signal generating apparatus and methods often have involved a pure pulse approach in order that the signal could be digitized. However, a problem with such a pure pulse approach is that the required data manipulations can occur only at specified points in time. Thus, adjacent samples may have sufficiently different frequencies that no smooth transition is achievable between samples.

The improved apparatus and method disclosed for generating sinusoidal signals enables generation of a mathematically continuous (as opposed to a discrete sample represented) signal. Such a continuous mathematical signal can be finessed from period to period (i.e., sample to sample) to provide smooth segues in the varying signal parameter (e.g., frequency).

Thus, the present invention provides an apparatus and method for producing a sinusoidal signal and calculating transitions of a parameter "on the fly" from a first value to a second value. The preferred parameter illustrated in this application is frequency, but the approach and model disclosed apply equally well for any sinusoidal parameter.

SUMMARY OF THE INVENTION

An apparatus and method are disclosed for synthesizing a sinusoidal signal generated from a plurality of sample values taken at a plurality of sample times. Each respective sample value is generated at a respective sample time, the plurality of sample times defining a plurality of succeeding sample intervals. The sinusoidal signal is defined by at least one parameter value, a particular parameter value of the at least one parameter value varying by a step value during a predetermined sample intervals of the plurality of sample interval when the particular parameter value changes from the first parameter value to a second parameter value. The apparatus comprises a first logic unit for iteratively treating an initial value of the step value to generate succeeding samples of the step value and a next step value. The next step value is the step value in a next-succeeding sample interval of the plurality of sample intervals.

The apparatus further comprises a second logic unit for iteratively generating a next parameter value which is the particular parameter value during the next-succeeding sample interval. The second logic unit is operatively connected with the first logic unit and receives succeeding samples of the step value from the first logic unit. The second logic unit iteratively generates succeeding samples of an interim parameter value and iteratively generates succeeding samples of a derivative interim parameter value. The interim parameter value is the particular parameter value intermediate a current particular parameter value in a current sample interval and a next particular parameter value during a next-succeeding sample interval following the current sample interval. The derivative interim parameter value is algorithmically related with the interim parameter value.

Further, the second logic unit iteratively treats the succeeding samples of the interim parameter value and succeeding samples of the derivative interim parameter value to iteratively generate the next parameter value. The second logic unit continues such iterative generating of the next parameter value until the end of a time interval (or sample interval) or until the particular parameter value substantially equals the second parameter value.

In its preferred embodiment, the second logic unit includes a third logic unit for generating succeeding samples of the derivative interim parameter value. The third logic unit receives succeeding samples of the step value from the first logic unit and receives succeeding samples of the interim parameter value and iteratively generates the succeeding samples of the derivative interim parameter value.

The particular parameter value is preferably expressed as a particular parameter sinusoidal value; the particular parameter sinusoidal value being a sinusoidal value of an angular displacement representing the particular parameter value in a phasor representation.

The step value is also preferably expressed as a step value sinusoidal value being a sinusoidal value of an angular displacement representing the step value in a phasor representation.

Further, the interim parameter value is preferably expressed as an interim parameter value sinusoidal value which is a sinusoidal value of an angular displacement representing the interim parameter value in a phasor representation.

Still further, the derivative interim parameter value is preferably expressed as a derivative interim parameter value sinusoidal value which is a sinusoidal value of an angular displacement representing the derivative interim parameter value in a phasor representation; and the derivative interim parameter value sinusoidal value is preferably 90° displaced from the interim parameter value sinusoidal value in a phasor representation.

An advantage of the preferred embodiment of the present invention is that the first logic unit, the second logic unit, and the third logic unit are embodied as programmable logic units dealing with difference equations involving sinusoidal values, as opposed to dealing with equations which require deriving sinusoidal values from angular value inputs. Such treatment and calculation of the various values required by the apparatus and method of the present invention from directly entered values allows speedier calculation and therefore allows a higher sampling rate for providing samples to represent the desired sinusoidal signal being synthesized.

A further advantage of the preferred embodiment of the present invention is that such dealing in values, as opposed to deriving values from angular value inputs, also simplifies hardware requirements to support such logical activities.

It is, therefore, an advantage of the present invention to provide an apparatus and method for synthesizing a sinusoidal signal which directly employs sinusoidal values in effecting required logical calculations.

It is a further advantage of the present invention to provide an apparatus and method for synthesizing a sinusoidal signal which requires simple hardware.

It is yet a further advantage of the present invention to provide an apparatus and method for synthesizing a sinusoidal signal which can quickly calculate required values for accurately reproducing information regarding the sinusoidal signal.

Further advantages and features of the present invention will be apparent from the following specification and claims when considered in connection with the accompanying drawings illustrating the preferred embodiment of the invention.

DETAILED DESCRIPTION OF THE INVENTION

Figure 1:
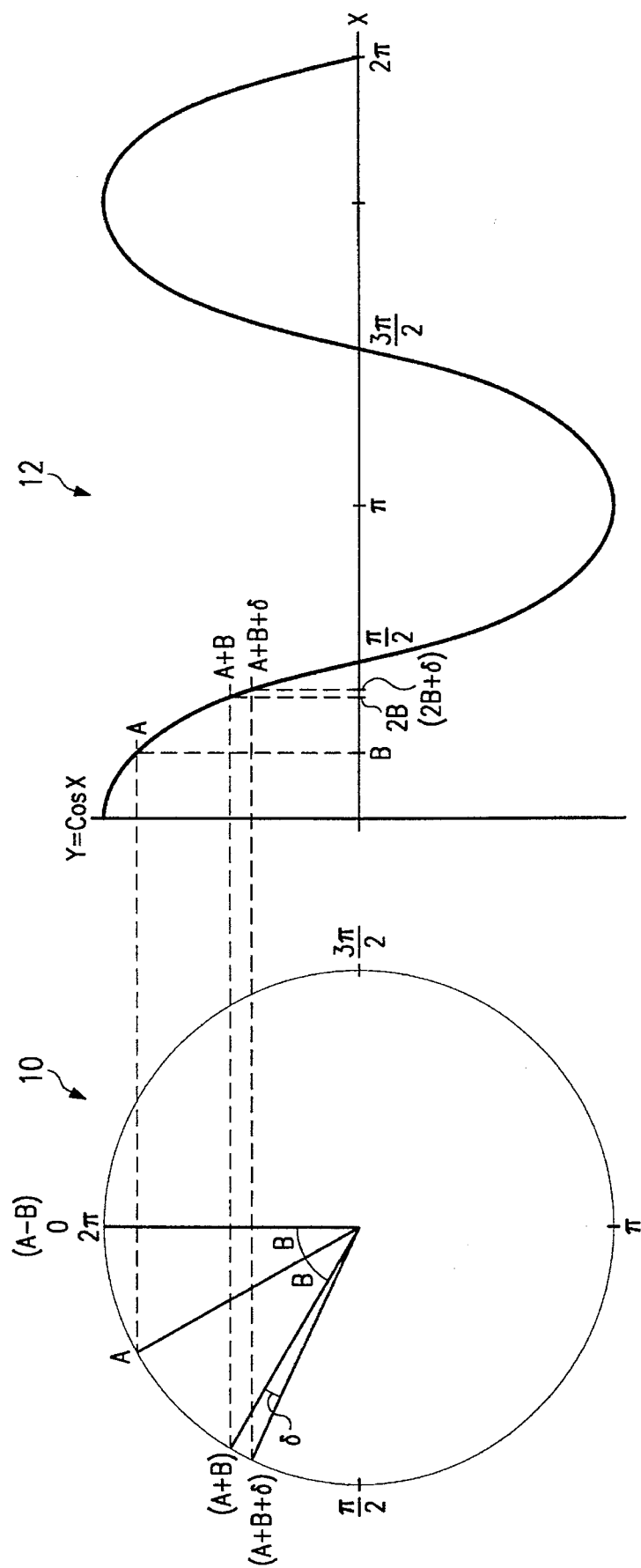
FIG. 1 is a basic phasor representation of signal synthesis.

FIG. 1 is a basic phasor representation of signal synthesis. In FIG. 1, a phasor representation 10, and its associated, more familiar, orthogonal axes representation 12 are illustrated. In phasor representation 10, since the function illustrated is y=cos x, the zero radian angle of displacement is situated at the top (north) position of phasor representation 10. If the phasor is displaced counterclockwise about phasor representation 10 by a phasor angle B, the value A of y=cos x at displacement X=B in two dimensional representation 12 corresponds to that phasor displaced by B radians in phasor representation 10. Thus, phasor angle B is analogous to angular velocity ω for a time-related function. Phasor angle B, therefore, as illustrated in FIG. 1, may be expressed as:

$$B = \frac{dA}{dx}$$

If the phasor angle B is altered during the traversal of the phasor in phasor diagram 10 (for example, in a situation where the frequency of the signal varies) the variation of phasor angle B may be represented by a value δ. That value δ step is analogous to angular acceleration (dω/dt) in a time-based relationship. Thus, in FIG. 1, δ may be characterized as:

$$\delta = \frac{dB}{dx}$$

Thus, in the orthogonal axes representation 12 of FIG. 1 a function y=f(x) is represented in (x,y) coordinates with displacement in radians (i.e., B) represented along the x-axis, and the function value y=f(x)=cos x is represented as function value A.

Figure 2:
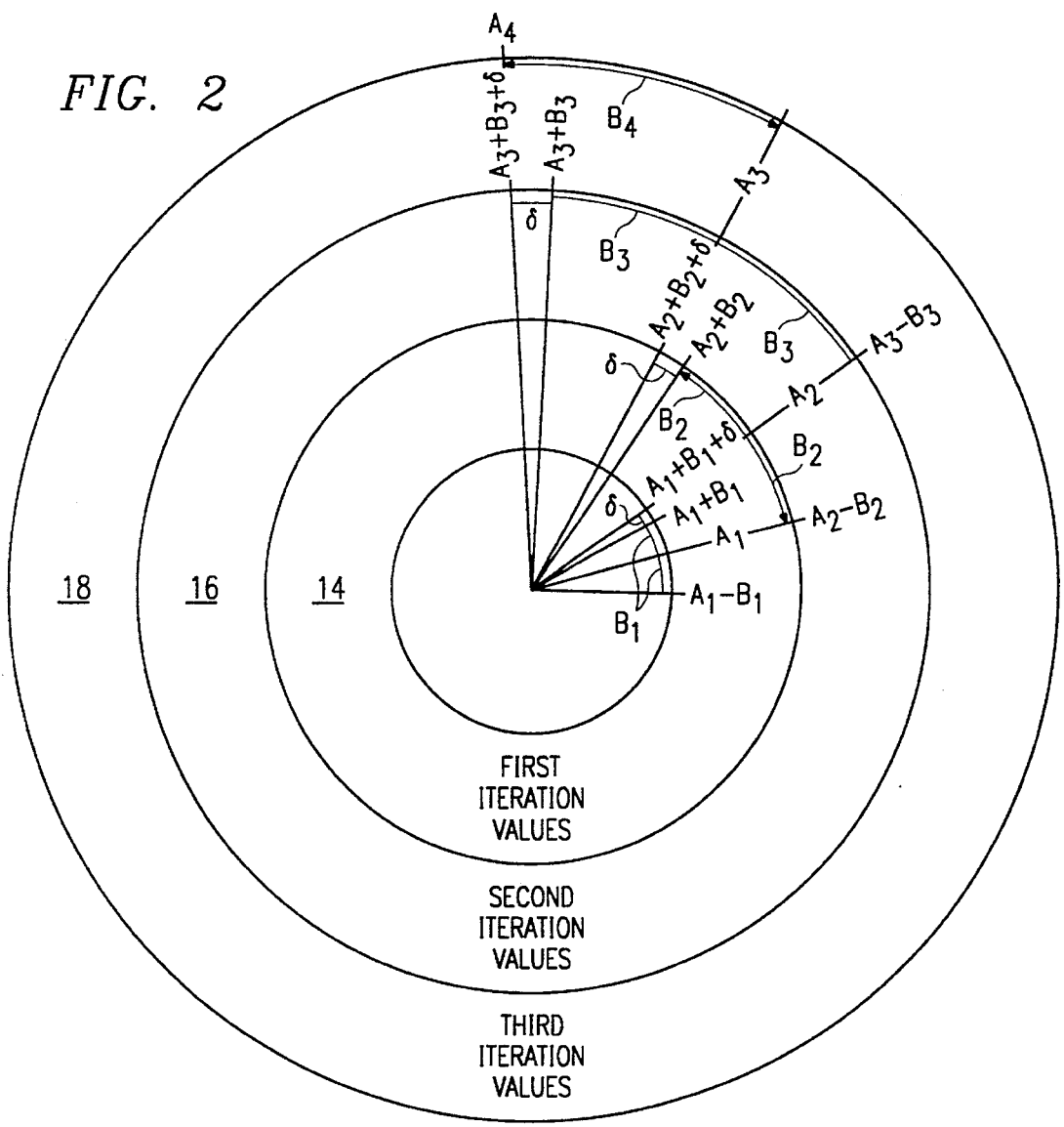
FIG. 2 is a phasor representation of iterative signal synthesis.

FIG. 2 is a phasor representation of iterative signal synthesis. In FIG. 2, a sinusoidal function (e.g., y=cos x) is represented as being iteratively generated during three iterations with the phasor angle B being increased during each iteration by a value δ. Such a situation may exist, for example, when one wishes to vary a frequency of a sinusoidal signal from a first frequency to a second frequency in linear fashion by increasing phasor angle B. In such a situation, the predetermined value δ is preferably chosen so that, in altering the sinusoidal signal from a first frequency f1 to a second frequency f2, phasor angle B may be altered from phasor angle $B_1$ to phasor angle $B_2$ such that:

$$\frac{B_2 - B_1}{n} = \delta$$

Where n=number of samples

Thus, in FIG. 2, a first iteration 14 provides that function value A vary from a first function value $A_1$ to a second function value $A_2$, the phasor angle difference between the function values $A_1$, $A_2$ being phasor angle $B_2$. However, phasor angle $B_2$ equals phasor angle $B_1$ plus δ.

In second iteration 16, function value $A_2$ is changed to function value $A_3$. The difference between the function values $A_2$, $A_3$ is phasor angle $B_3$; phasor angle $B_3$ is equal to phasor angle $B_3$ plus δ.

In third iteration 18, function value $A_3$ is changed to function value $A_4$. The difference between the function values $A_3$, $A_4$ is phasor angle $B_4$; phasor angle $B_4$ is equal to phasor angle $B_3$ plus δ.

Thus, in such an iteration where a parameter change is effected by a linearly changing phasor angle, it may be seen generally that:

$$B_{n+1} = B_n + \delta$$

This is a simplified example which presumes that δ is a constant to provide for linear change from a first parameter to a second parameter (in this example the parameter is frequency). Of course, δ could be varied according to any relationship (for example: a polynomial relationship, an exponential relationship, or a sinusoidal relationship) without affecting the validity of the relationships illustrated in this description.

Thus, the signal represented by a function which is expressible by a phasor notation, as illustrated in FIGS. 1 and 2, is modulated by variation of value δ. In order to facilitate understanding of the present invention and to keep the explanation straightforward, value δ will be presumed hereinafter to vary linearly, that is δ is presumed to be a constant locally within a given sample or analysis interval.

By inspection of FIG. 2, observe:

$$\cos(A_{n+1}) = \cos(A_n + B_{n+1}) = \cos(A_n + B_n + \delta)$$

$$\cos(A_{n-1}) = \cos(A_n - B_n)$$

$$B_{n+1} = B_n + \delta$$

$$B_{n+1} = B_n - \delta$$

The following discussion will rely upon the four following relationships:

$$\cos(x+y) = 2\cos x \cos y - \cos(x-y) \quad (1)$$

$$\sin(x+y) = 2\sin x \cos y - \sin(x-y) \quad (2)$$

$$\cos(x+y) = \cos x \cos y - \sin x \sin y \quad (3)$$

$$\sin(x+y) = \sin x \cos y + \cos x \sin y \quad (4)$$

Thus, the iterative modulation of a signal (such as, for example, the cosine signal of FIG. 2) may be algebraically represented as follows:

Stage 1: Determine cos $(A_n+B_n)$ using Eqn (1) above with $x=A_n$, $y=B_n$:

$$\cos (A_n+B_n)=2 \cos A_n \cos B_n-\cos (A_n-B_n) \qquad (5)$$

or $$\cos (A_n+B_n)=2 \cos B_n \cos A_n-\cos A_{n-1}$$

This expression may be rewritten as:

$$X^C_{A+B}=2 \cos B_n X^C_n - X^C_{n-1} \qquad [D1]$$

where:
$X^C_{A+B}=\cos (A_n+B_n)$
$X^C_n=\cos A_n$
$X^C_{n-1}=\cos A_{n-1}$

Stage 2: Determine sin $(A_n+B_n)$ using Eqn (2) above with $x=A_n$, $y=B_n$:

$$\sin (A_n+B_n)=2 \sin A_n \cos B_n-\sin (A_n-B_n) \qquad (6)$$

This expression may be rewritten as:

$$X^S_{A+B}=2 \cos B_n X^S_n - X^S_{n-1} \qquad [D2]$$

where:
$X^S_{A+B}=\sin (A_n+B_n)$
$X^S_n=\sin A_n$
$X^S_{n-1}=\sin A_{n-1}$

Stage 3: Determine cos $(A_n+B_n+\delta)$ using Eqn (3) above, with $x=(A_n+B_n)$, $y=\delta$:

$$\cos (A_n+B_n+\delta)=\cos (A_n+B_n) \cos \delta-\sin (A_n+B_n) \sin \delta \qquad (7)$$

This expression may be rewritten as:

$$\cos A_{n+1}=\cos (A_n+B_n) \cos \delta-\sin (A_n+B_n) \sin \delta$$

-or- $$X^C_{n+1}=V^C_\delta X^C_{A+B}-V^C_\delta X^S_{A+B} \qquad [C1]$$

where:
$X^C_{n+1}=\cos A_{n+1}$
$V^C_\delta=\cos \delta$
$V^S_\delta=\sin \delta$ Stage 4: Determine sin $(A_n+B_n+\delta)$ using Eqn (4) above, with $x=(A_n+B_n)$, $y=\delta$.

$$\sin (A_n+B_n+\delta)=\sin (A_n+B_n) \cos \delta+\cos (A_n+B_n) \sin \delta \qquad (8)$$

This expression may be rewritten as:

$$\sin A_{n+1}=\sin (A_n+B_n) \cos \delta+\cos (A_n+B_n) \sin \delta$$

-or- $$X^S_{n+1}=V^C_\delta X^S_{A+B}+V^S_\delta X^C_{A+B} \qquad [C2]$$

where:
$X^S_{n+1}=\sin A_{n+1}$

Stage 5: Determine cos $(B_n+\delta)$ using Eqn (1) above, with $x=B_n$, $y=\delta$.

$$\cos (B_n+\delta)=2 \cos B_n \cos \delta-\cos (B_n-\delta) \qquad (9)$$

This expression may be rewritten as:

$$\cos B_{n+1}=2 V^C_\delta \cos B_n-\cos B_{n-1}$$

or $$X^B_{n+1}=2 \cos \delta X^B_n - X^B_{n-1} \qquad [D3]$$

where:
$X^B_n=\cos B_n$
$X^B_{n+1}=\cos B_{n+1}$
$X^B_{n-1}=\cos B_{n-1}$

Stage 6: For the next iteration replace

| Second Iteration Value | First Iteration Value |
|---|---|
| cos $(A_2 - B_2)$ | cos $A_1$ |
| cos $A_2$ | cos $(A_1 + B_1 + \delta)$ |
| cos $B_2$ | cos $(B_1 + \delta)$ |
| sin $(A_2 - B_2)$ | sin $A_1$ |
| sin $A_2$ | sin $(A_1 + B_1 + \delta)$ |

Inspection of FIG. 2 reveals that this is precisely the relationship depicted. In second iteration 16 the value $A_2-B_2$ equals the value of $A_1$ of first iteration 14. Further, in second iteration 16 the value $A_2$ is equal to the value $(A_1+B_1+\delta)$. Still further, the value $B_2$ is equal to $B_1+\delta$. One will observe that, at the start of first iteration 14, all angle differences are equal to phasor angle $B_1$, and at the end of first iteration 14, all angle differences are the value $B_2=(B_1+\delta)$. The iteration process can be repeated through the six stages related above for as long as desired. However, a useful apparatus must be able to change the rate of modulation (value $\delta$). The inventors have termed the points at which the rate of change of modulation is changed, "corner points".

Corner points may be inserted at any time and may, in the extreme, be inserted on a sample-by-sample (i.e., iteration-by-iteration) basis. Frequent insertion of corner points will enable quite close approximation of almost any sinusoidal function by a linearly modulated function (i.e., constant $\delta$). A simple representation of corner points is a continuous piecewise linear function. That is, the start of a given linear element of the function occurs at the same point as the end of a preceding linear element. A non-continuous piecewise linear function would not have a common point shared by adjacent linear elements.

For simplicity, regarding the piecewise continuous linear function corner point case, assume that at a corner point $\delta$ changes from $\delta$ to $\delta_1$. When $\delta$ is changed to $\delta_1$, stages 1 through 4 of the iteration process above may proceed unchanged. At stage 5, however, one knows the values of cos B and cos (B–$\delta$) from the previous iteration. However, in order to apply Eqn (1) to perform stage 5 using $y=\delta_1$, one requires knowledge of cos B and cos (B–$\delta_1$). Thus, a corner point process must be inserted between stages 4 and 5.

It is worthy of note that we have assumed in this discussion that cos $\delta$ and sin $\delta$ are known. Because, in general, $\delta$ is updated infrequently, cos $\delta$ and sin $\delta$ can be determined by any suitable process (e.g., table look-up or sinusoidal generator) without having a great effect upon the overall system complexity.

Regarding the corner point process intermediate stages 4 and 5, cos (B–$\delta_1$) is determined using Eqn (3) with $x=(B-\delta)$, $y=(\delta-\delta_1)$. Thus, one must know the value of cos $(\delta-\delta_1)$ and sin $(\delta-\delta_1)$.

Since these values are required only at corner points, and therefore relatively infrequently, they can be determined using the same process used to determine cos $\delta$ and sin $\delta$. That is, they can be determined by a table look-up, or by a cosine generator, or by other known methods or processes. Further, one also requires knowledge of sin (B–$\delta$).

cos (B–δ) is known because of its use in the iteration at stage 1.

A well-known equivalent relation in mathematics is that $\cos^2 x + \sin^2 x = 1$. This may be rewritten as $\sin^2 x = 1 - \cos^2 x$, or:

$$\sin x = \pm \sqrt{1 - \cos^2 x} \qquad (10)$$

Thus, one can determine sin (B–δ) given cos (B–δ). The sign of Eqn (10) is always positive because the range of the value of B is preferably chosen to ensure such a result. It is possible, however, to determine the sign of Eqn (10) using the below-described procedure. Such a procedure may be required in certain circumstances. Further, the below-described procedure is required in later steps for computing the sign of the square root when computing sin $(A_n - B_n)$ from cos $(A_n - B_n)$.

In order to determine the correct sign, one must employ a well-known relationship:

$$\frac{d}{dx}(\cos x) = -\sin x \qquad (11)$$

Thus, if $$\frac{d}{dx}(\cos x)$$

is positive, then sin x is negative and if $$\frac{d}{dx}(\cos x)$$

is negative, then sin x is positive.

cos B and cos (B–δ) are known from the above-described process. However, this information is not sufficient to determine whether the slope of cos x at x=B is positive or negative.

We can, however, use Eqn (1), with x=B, y=δ to determine cos (B+δ). Such knowledge of cos (B–δ), cos B and cos (B+δ) suffices to determine the slope of cos x at x=B.

Figure 3A:
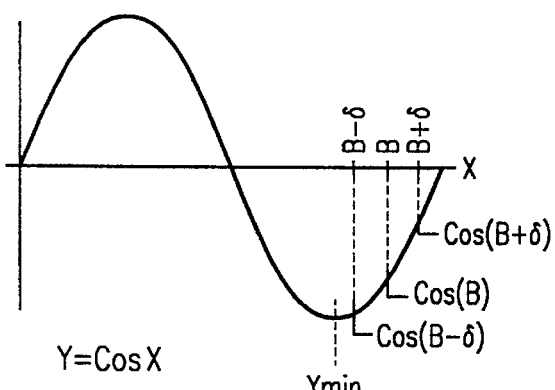
FIGS. 3(a)–3(f) are graphic representations of various cases relating to the sample displacement value for a sinusoidal signal.

There are six possible cases; FIGS. 3(a)–3(f) are graphic representations of the six cases relating to sample displacement value for a sinusoidal signal. In FIG. 3(a), the function y=cos x passes a minimum point at $y_{min}$. cos (B+δ) is greater than cos B, and cos B is greater than cos (B–δ). Thus, the slope of cos x at x=B is positive and cos (B+δ)–cos (B–δ)>0.

Figure 3B:
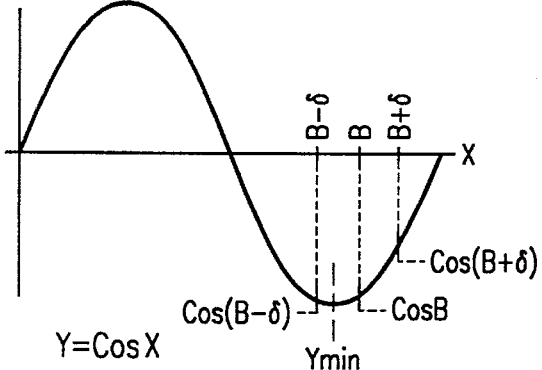

In FIG. 3(b), y=cos x passes a minimum point at $y_{min}$. cos (B+δ) is greater than cos B, cos (B+δ) is greater than cos (B–δ), and cos (B–δ) is greater than cos B. Thus, the slope of cos x at x=B is positive and cos (B+δ)–cos (B–δ)>0.

Figure 3C:
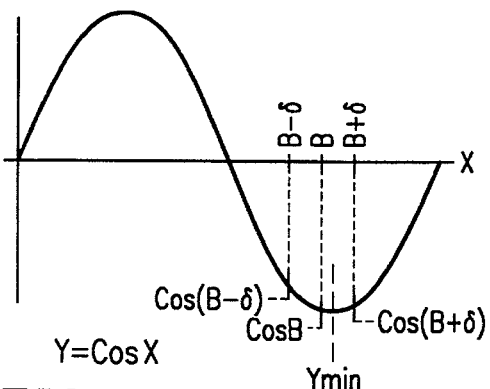

In FIG. 3(c), y=cos x passes a minimum point with $y_{min}$. cos (B+δ) is greater than cos B; cos (B–δ) is greater than cos B; and cos (B+δ) is less than cos (B–δ). Thus the slope of cos x at x=B is negative and cos (B+δ)–cos (B–δ)<0.

Figure 3D:
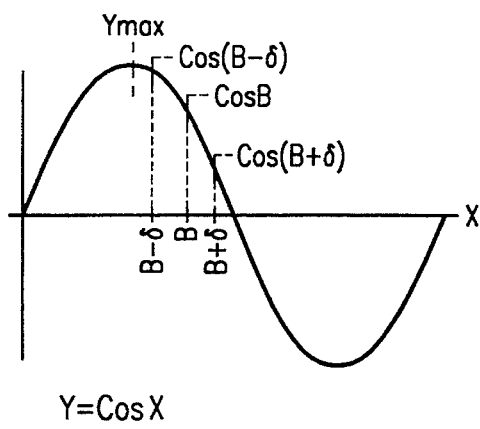

In FIG. 3(d), y=cos x passes a maximum point at $y_{max}$. cos (B+δ) is less than cos B which, in turn, is less than cos (B–δ). Thus, the slope of cos x at x=B is negative and cos (B+δ)–cos (B–δ)<0.

Figure 3E:
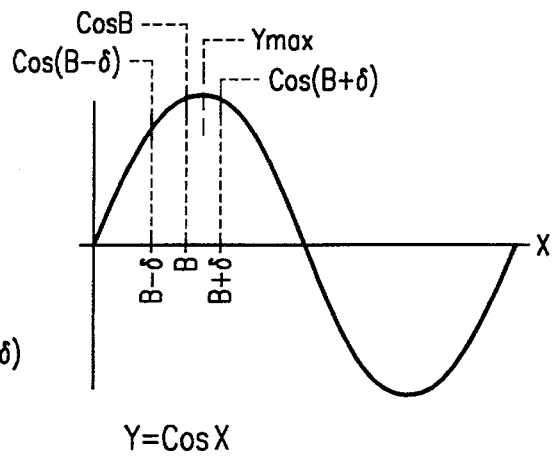

In FIG. 3(e), y=cos x passes a maximum point at $y_{max}$. cos (B+δ) is less than cos B; cos (B+δ) is greater than cos (B–δ); and cos (B–δ) is less than cos B. Thus, the slope of cos x at x=B is positive and cos (B+δ)–(B–δ)>0.

Figure 3F:
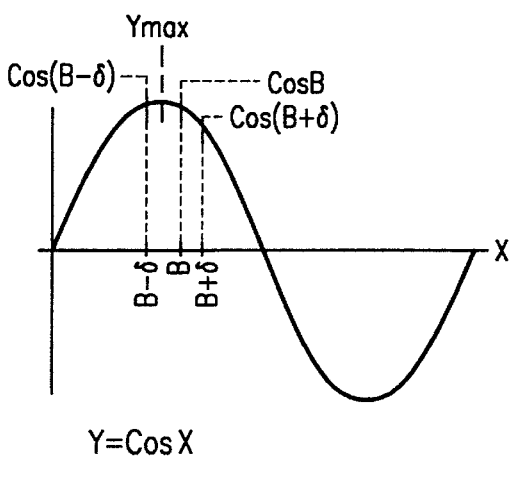

In FIG. 3(f), y=cos x passes a maximum point at $y_{max}$. cos (B+δ) is less than cos B; cos (B+δ) is less than cos (B–δ); and cos (B–δ) is less than cos B. Thus, the slope of cos x at x=B is negative and cos (B+δ)–cos (B–δ)<0.

The correlation of slope relationship to cos (B+δ)–cos (B–δ) is summarized for FIGS. 3(a)–(f) in the following table:

| FIG. 3 | cos (B + δ) – cos (B – δ) | Slope |
| --- | --- | --- |
| (a) | + | + |
| (b) | + | + |
| (c) | – | – |
| (d) | – | – |
| (e) | + | + |
| (f) | – | – |

Thus, the sign of the slope of cos x at x=B, and consequently the inverse of the sign of sin x at x=B, is determined by the sign of the quantity [cos (x+δ)–cos (x–δ)] at x=B. The above conclusion is based upon well-known properties of the function f(x)=cos x and, in particular, knowledge of the shape of that function and the fact that the function is continuous and symmetrical about points with a slope of f'(x)=0.

Given infinite mathematical precision and accuracy, Eqn (5) will accurately generate cos $(A_n + B_n)$ as n approaches infinity. However, such is not the case for a finite accuracy mathematical system (such as a microprocessor-based system). Inaccuracies born of imprecision caused by less than infinite accuracy feed back through the calculations and eventually cause divergence from the desired true result. The rate of divergence and the speed of onset of significant errors increase as the number of significant digits in the arithmetic representation decreases. A correction mechanism is required in order to achieve satisfactory performance of a finite system employing the iterative process described for generating a sinusoidal signal.

Such a correction mechanism recognizes the limitations imposed upon a calculation of the iterative generation of a sinusoidal wave as described above by the finite capabilities of a system such as a microprocessor-based system. That is, the employment of difference equations employing actual values for sinusoidal terms such as cosine and sine, as opposed to deriving the values of cosine and sine from angle values, inherently injects error through each iterative calculation.

There are two correction mechanisms which are useful for the present invention: modular retracking and resanitization.

Modular retracking may be performed periodically at any time, but is preferably performed at the end of a sample analysis frame or period. Modular retracking recognizes that iterative treatment of a sinusoidal relationship to accommodate a change of parameter (such as frequency) from a first parametric value to a second parametric value over a predetermined time period may not precisely result in the particular changed parameter having the desired second parametric value at the intended time. As previously mentioned, such inaccuracy can especially result in a finite mathematical system. The preferred method for accommodating (and correcting) such inaccuracies in the present invention is to determine the step value for effecting parametric value change over a second (succeeding) time period (i.e., analysis frame) using the actual parametric value at the end of the first time period as the initial parametric value for the second time period. That is, the actual initial parametric value is used rather than using the target (i.e., expected, or theoretical) parametric value in determining the appropriate step value for effecting the desired parametric value change during the second time period. Thus, the step value required for parametric transition in the second time period will reflect real-time conditions. "Blindly" using theoretical values will almost certainly result in unacceptable error in a relatively few analysis frames (time periods).

"Resanitization" is a term coined by the inventors to indicate the process of restoring the "sanity" of the presumption that sinusoidal values are accurate in the difference equations (D1, D2, D3) and combination equations (C1, C2) employed in the preferred embodiment of the present invention.

An example of a resanitization process in connection with the present invention is as follows:

Step 1. Assume the truth of $V^C_\delta = \cos \delta$; known $X^B_n = \cos B_n$; known Step 2. Determine $V^S_\delta$:

$$\sin \delta = \pm \sqrt{1 - \cos^2 \delta}$$

$$V^S_\delta = \pm \sqrt{1 - (V^C_\delta)^2}$$

Since $\delta$ is known, the above calculation may be made and the sign assigned by the known value of $\delta$. In the alternative, $\sin \delta$ and $\cos \delta$ may be supplied by other known means, such as by a look-up table or a sine/cosine generator.

Step 3. Since $X^B_n$ is a term for a difference equation which is an actual value representing $\cos B_n$, the value of $X^B_n$ can be >1 or <−1. Of course, such a value can never exist for $\cos B_n$. Therefore, we must reset $X^B_n$ as follows:

If $X^B_n > 1$ set $X^B_n = 1$

If $X^B_n < -1$ set $X^B_n = -1$

Step 4. Determine $\sin B_n$:

$$\sin B_n = \pm \sqrt{1 - \cos^2 B_n}$$

In general, the sign of the above expression should always be positive since $B_n$ will preferably lie in the first or second quadrant. Values of $B_n$ in the third or fourth quadrant imply either negative frequency or aliasing. Neither of those conditions is desirable in most applications. The sign may be determined by determining the sign of [$\cos (B_n+\delta) - \cos (B_n-\delta)$]; that is, [$X^B_{n+1} - X^B_{n-1}$], as described above in connection with FIG. 3.

Step 5. Using Eqn (3) [$\cos (x+y) = \cos x \cos y - \sin x \sin y$], with $x=B_n$, $y=-\delta$:

$$\cos (B-\delta) = X^B_{n-1} = \cos B_n \cos (-\delta) - \sin B_n \sin (-\delta)$$

It is well-known that:

$$\cos (-\delta) = \cos \delta$$

$$\sin (-\delta) = -\sin \delta$$

Thus, the above expression may be written as:

$$X^B_{n-1} = \cos B_n \cos \delta + \sin B_n \sin \delta$$

$\cos B_n$ is known (Step 1)
$\cos \delta$ is known (Step 1)
$\sin \delta$ is known (Step 2)
$\sin B_n$ is known (Step 3)
$X^B_{n-1}$ is determined.

Step 6. Using Eqn (3), with $x=A_n$, $y=-B_n$:

$$\cos (A_n - B_n) = X^C_{n-1}$$

$$X^C_{n-1} = \cos A_n \cos (-B_n) - \sin A_n \sin (-B_n)$$

Which may be rewritten as:

$$X^C_{n-1} = \cos A_n \cos B_n + \sin A_n \sin B_n$$

$\cos B_n$ is known (Step 1)
$\sin B_n$ is known (Step 3)
$\cos A_n$ is assumed as part of the resetting which is effected by the resanitization process.
$\sin A_n$ may be determined:

$$\sin A_n = \pm \sqrt{1 - \cos^2 A_n}$$

The sign is determined by determining the sign of ($\cos (A_n+B_n) - \cos (A_n-B_n)$); that is, ($X^C_{A+B} - X^C_{A-B}$). One may note that this expression is the same relationship as recited in connection with Step 4 above, with $A_n$ substituted for $B_n$, and with $B_n$ substituted for $\delta$. Thus, $X^C_{n-1}$ is determined.

Step 7. Using Eqn (4), with $x=A_n$, $y=-B_n$:

$$\cos (A_n - B_n) = X^S_{n-1}$$

$$X^S_{n-1} = \sin A_n \cos (-B_n) + \cos A_n \sin (-B_n)$$

which may be rewritten as:

$$X^S_{n-1} = \sin A_n \cos B_n - \cos A_n \sin B_n$$

$\cos B_n$ is known (Step 1)
$\sin B_n$ is known (Step 3)
$\cos A_n$ is assumed as part of the resetting which is effected by the resanitization process.
$\sin A_n$ is known (Step 6)
Thus, $X^S_{n-1}$ is determined.

In summary, by resetting (i.e., assuming the truth, or sanity, of) $\cos \delta$ ($V^C_\delta$), $\cos B_n$ ($X^B_n$), and $\cos A_n$ ($X^C_n$), all other values in difference equations (D1, D2, D3) and combination equations (C1, C2) may be reset.

The above is an example of a resanitization process. Other assumptions and variations may be used to accomplish the same goal: to restore the "sanity" of presumptions in the difference equations (D1, D2, D3) and combination equations (C1, C2) to preclude divergence of the relationships because of inaccuracies born of finite mathematical calculations.

Clearly the calculations required in the resanitization process and in the modular retracking process are relatively time consuming compared with the time required to calculate the various difference equations (D1, D2, D3) and combination equations (C1, C2). Accordingly, it is preferable that the modular retracking and resanitization processes be effected relatively infrequently as compared with the frequency at which the difference equations (D1, D2, D3) and combination equations (C1, C2) are exercised.

Figure 4:
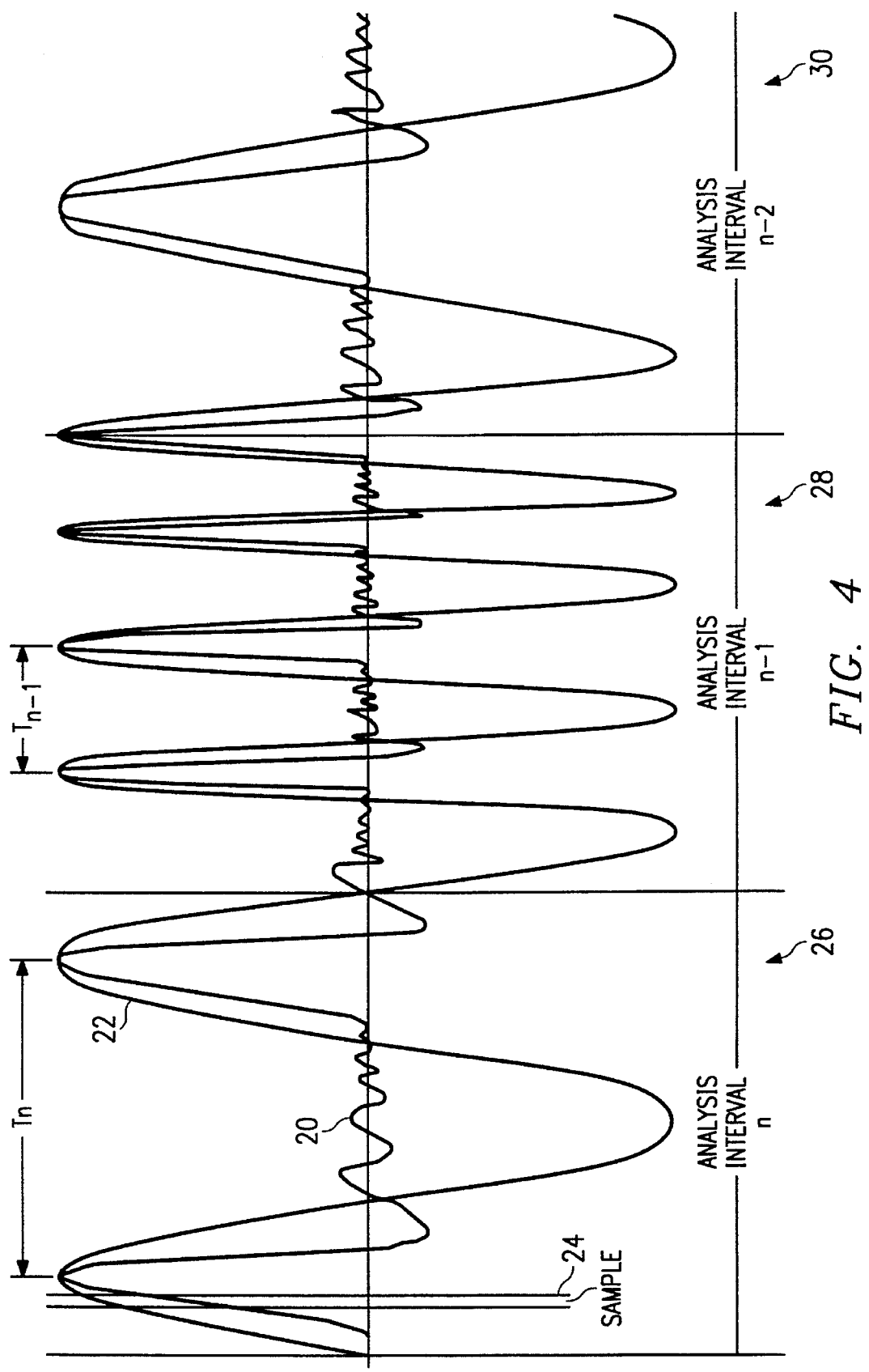
FIG. 4 is a graphic representation of a voice signal with a fundamental sinusoidal signal indicated.

FIG. 4 is a graphic representation of a voice signal with its fundamental sinusoidal frequency. In FIG. 4, a voice signal 20 is illustrated; the fundamental sinusoidal frequency 22 (pitch component) related with voice signal 20 is also illustrated. Voice signal 20 is sampled during a plurality of sample intervals, represented by sample interval 24. Preferably, analysis of signals 20, 22 occurs during succeeding analysis intervals, represented by analysis intervals 26, 28, 30. The period T of signals 20, 22 may change, as indicated by the period of signals 20, 22 in analysis interval 26 being a period $T_n$, and the period of signal 20, 22 in analysis interval 28 being a period $T_{n-1}$.

A representative sample interval for a voice-band signal could be 125 microseconds. A representative analysis interval for such a voice-band signal may, for example, involve 160 samples per analysis frame for a duration of each analysis frame equal to 20 milliseconds. Of course, the present invention is compatible with any signal which may be represented by a fundamental sinusoidal signal or approximated by a sinusoidal signal. The present invention is not limited to voice-band signals. The voice-band signal illustrated in FIG. 4 is included here for illustration purposes only.

Figure 5:
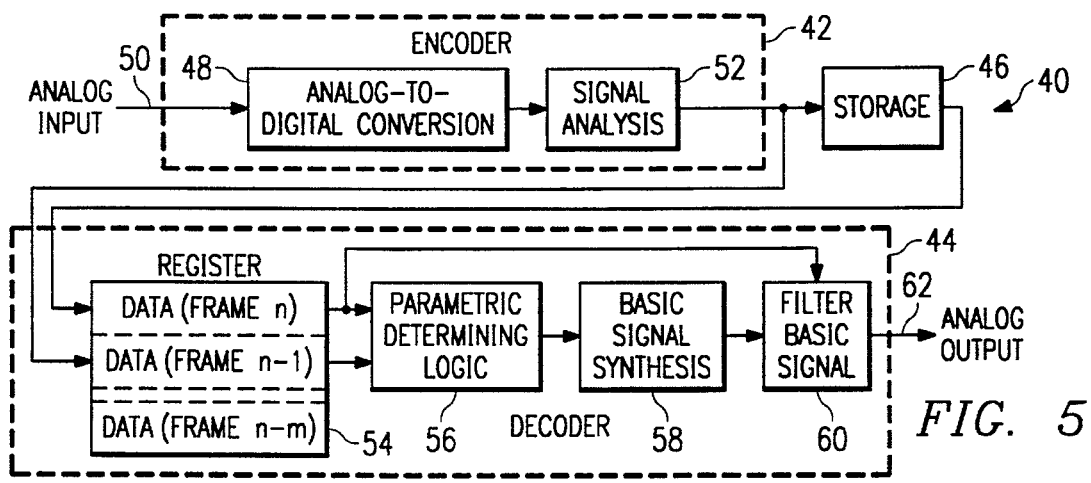
FIG. 5 is a schematic diagram of a signal processing system using the present invention.

FIG. 5 is a schematic diagram of a signal processing system appropriate for processing a signal such as the voice-band signal illustrated in FIG. 4, using the present invention.

In FIG. 5, a signal processing system 40 includes an encoder 42, a decoder 44, and a storage unit 46. Encoder 42 includes an analog-to-digital conversion unit 48 which receives an analog signal (such as, for example, signals 20 and 22) at an analog input 50. Analog-to-digital conversion unit 48 converts the analog signal received at analog input 50 to a digital representation of that received signal and passes that digital representation to a signal analysis unit 52. Signal analysis unit 52 may be employed to determine particular aspects of the signal received at analog input 50, such as various parameters (e.g., frequencies) and parametric changes from analysis frame to analysis frame. The results of signal analysis performed by signal analysis unit 52 are stored in storage unit 46 and are passed to a register 54 in decoder unit 44. Data may be stored in storage unit 46 and in register 54, for example, to save the signal analysis output from signal analysis unit 52 relating to respective analysis frames. In the alternative, storage unit 46 may be eliminated, and appropriate data may be stored in register 54 alone. Information relating to the analyzed signal information from signal analysis unit 52 relating to earlier analysis frames than the currently extant analysis frame may be provided from storage unit 46 to register 54 in an appropriate portion of register 54 for each respective data frame.

A parametric determining logic unit 56 receives information relating to at least two succeeding data frames in order to determine appropriate parameters (such as $\delta$, $B_n$, and the like; representative are parameters discussed above in connection with the present invention) for supply to a basic signal synthesis unit 58. In this representative apparatus 40 employing the present invention, the present invention resides in and generally comprises basic signal synthesis unit 58. Information from register 54 and basic signal synthesis unit 58 is provided to a filter unit 60. Filter unit 60 may take the output from basic signal synthesis unit 58 which will provide a sinusoidal signal, such as signal 22 in FIG. 4 (constituting, for example, a pitch component for a voice reproduction signal). Filter unit 60 may impose voice tract or other information upon the pitch component received from basic signal synthesis unit 58 to produce an analog output signal at analog output 62 which substantially faithfully reproduces the analog signal received at analog input 50.

Figure 6:
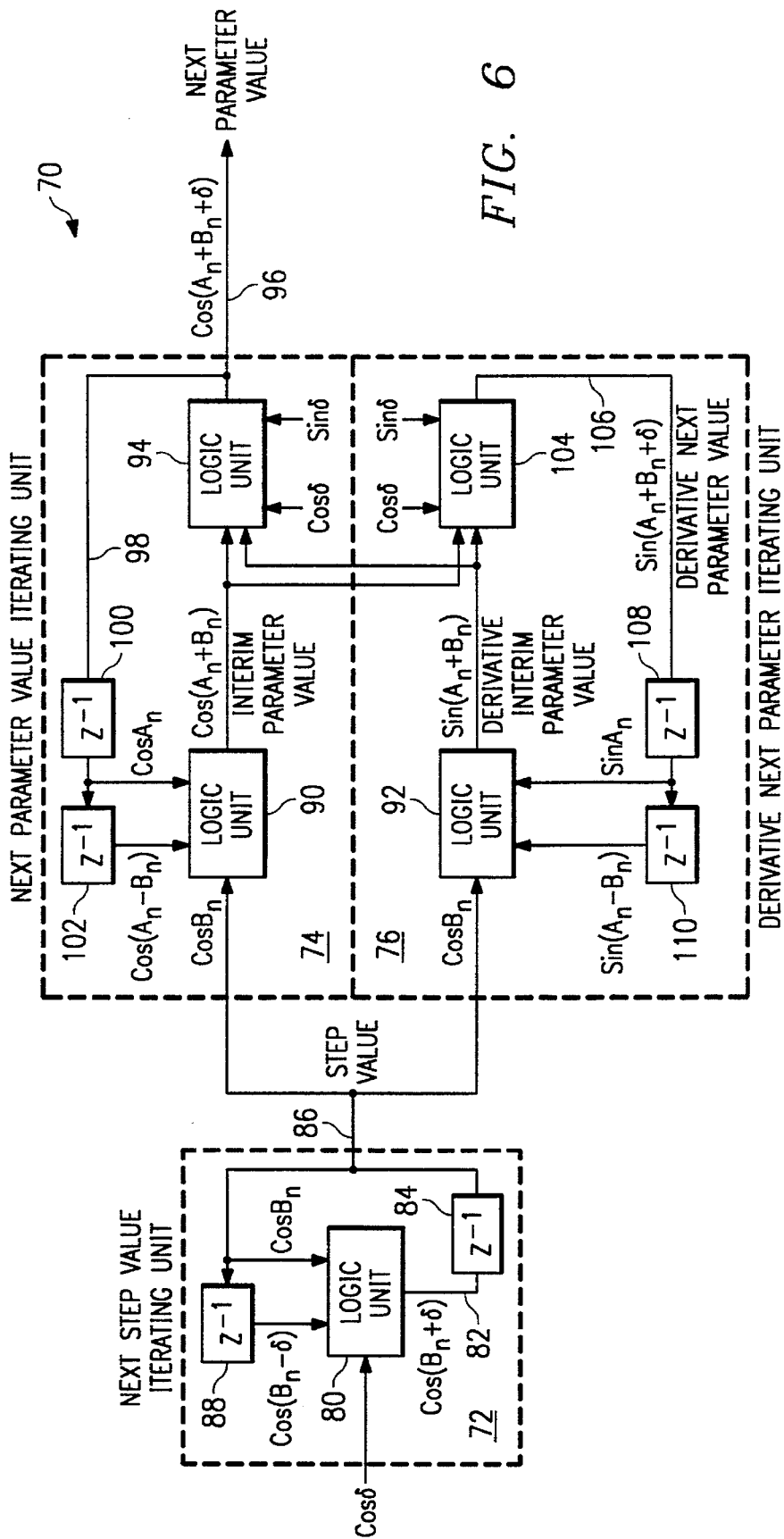
FIG. 6 is a schematic diagram of an embodiment of the present invention.

FIG. 6 is a schematic diagram of an embodiment of the present invention. In FIG. 6, an apparatus 70 includes a next step value iterating unit 72, a next parameter value iterating unit 74, and a derivative next parameter iterating unit 76.

A logic unit 80 in next step value iterating unit 72 receives an input value cos $\delta$ and initial input values cos $B_n$ and cos $(B_n-\delta)$ to generate, according to Eqn (9), the value cos $(B_n+\delta)$ at an output 82. A delay filter unit 84 imposes a delay on the signal appearing at output 82 so that a signal cos $B_n$ is produced on line 86. Line 86 is fed back through a delay filter unit 88 to provide a feedback input to logic unit 80 having the values cos $B_n$ and cos $(B_n-\delta)$. Thus, next step value iterating unit 72 iteratively generates step values cos $B_n$ on line 86.

The various delay filter units described in connection with FIG. 6 are clocked at a predetermined time. Theoretically, they are all clocked at once, but as a practical matter they may be just-in-time cascade clocked. However they may be clocked, the result is that the input to a given delay filter unit is shifted to the output of that delay filter unit at the time the particular delay filter unit is clocked. It is by this clocking arrangement that iteration is effected by apparatus 70.

Step value cos $B_n$ on line 86 is applied to a logic unit 90 in next parameter value iterating unit 74. Logic unit 90 receives initial values representing cos $(A_n-B_n)$ and cos $A_n$ and generates an interim parameter value cos $(A_n+B_n)$, preferably according to Eqn (5).

Step value cos $B_n$ is also supplied from line 86 to a logic unit 92 in derivative next parameter iterating unit 76. Logic unit 92 receives initial values representing sin $(A_n-B_n)$ and sin $A_n$ and generates a derivative interim parameter value sin $(A_n+B_n)$, preferably according to Eqn (6). Both derivative interim parameter value sin $(A_n+B_n)$ and interim parameter value cos $(A_n+B_n)$ are applied to a logic unit 94 in next parameter value iterating unit 74. Logic unit 94 receives initial values representing cos $\delta$ and sin $\delta$ and generates a next parameter value cos $(A_n+B_n+\delta)$ at an output 96, preferably according to Eqn (7). Next parameter value cos $(A_n+B_n+\delta)$ is fed back by a line 98 to a delay filter unit 100, and thence to a delay filter unit 102, from which iterated values of cos $(A_n-B_n)$ and cos $A_n$ are provided to logic unit 90. Thus, next parameter value iterating unit 74 iteratively generates interim parameter value cos $(A_n+B_n)$ and next parameter value cos $(A_n+B_n+\delta)$.

Similarly, both derivative interim parameter value sin $(A_n+B_n)$ and interim parameter value cos $(A_n+B_n)$ are applied to a logic unit 104 in derivative next parameter iterating unit 76. Logic unit 104 receives initial values of cos $\delta$ and sin $\delta$, and generates a derivative next parameter value sin $(A_n+B_n+\delta)$, preferably according to Eqn (8). Derivative next parameter value sin $(A_n+B_n+\delta)$ is fed back via a line 106 to a delay filter unit 108, and thence to a delay filter unit 110, from which iterated values of sin $(A_n-B_n)$ and sin $A_n$ are provided to logic unit 92. Thus, derivative next parameter value iterating unit 76 iteratively generates derivative interim parameter value sin $(A_n+B_n)$ and derivative next parameter value sin $(A_n+B_n+\delta)$.

Figure 7:
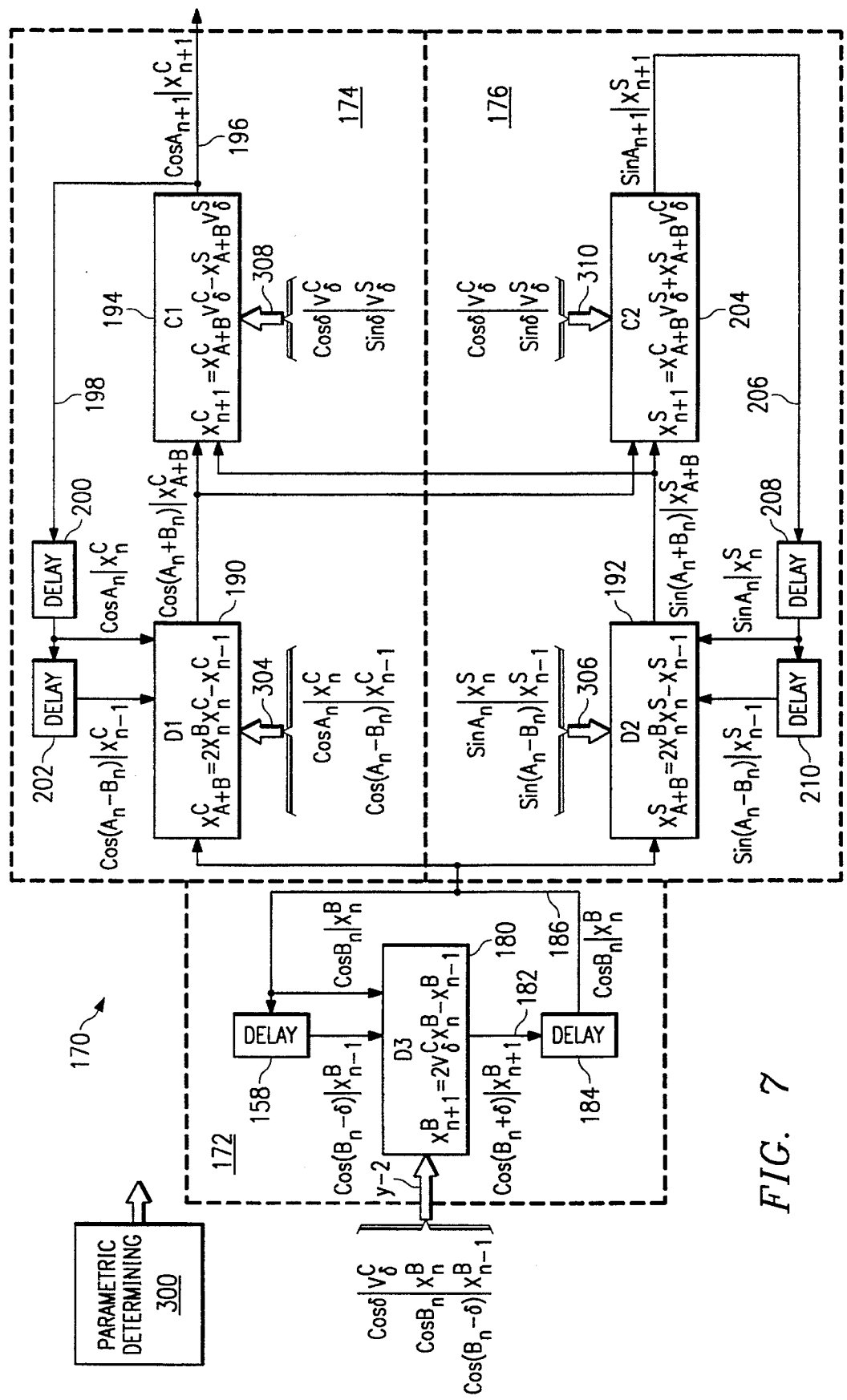
FIG. 7 is a schematic diagram of the preferred embodiment of the present invention.

FIG. 7 is a schematic diagram of the preferred embodiment of the present invention. In FIG. 7, an apparatus 170 includes a next step value iterating unit 172, a next parameter value iterating unit 174, and a derivative next parameter iterating unit 176. Next step value iterating unit 172 includes a logic unit 180 which periodically receives input values $V^C_\delta$ (representing cos $\delta$), $X^B_n$ (representing cos $B_n$), and $X^B_{n-1}$ (representing cos $(B_n-\delta)$). Initially, logic unit 180 also receives an initial value $X^B_{n-1}$ (representing cos $(B_n-\delta)$) and an initial value $X^B_n$ (representing cos $B_n$). Logic unit 180 calculates a value $X^B_{n+1}$ (representing cos $(B_n+\delta)$) according to difference equation D3:

$$X^B_{n+1} = 2V^C_\delta X^B_n - X^B_{n-1}$$

The value $X^B_{n+1}$ is applied by a line 182 to a delay unit 184. Delay unit 184 outputs a value (representing cos $B_n$) on a line 186. Line 186 provides the value $X^B_n$ (representing cos $B_n$) to logic unit 180 and to a delay unit 188; delay unit 188 provides a value $X^B_{n-1}$ (representing cos $(B_n-\delta)$) as an input to logic unit 180 so that next step value iterating unit 172 may iteratively generate value $X^B_n$ on line 186.

Value $X^B_n$ is applied as an input to a logic unit 190 in next parameter value iterating unit 174. Logic unit 190 receives initial values $X^C_{n-1}$ (representing cos $(A_n-B_n)$), and $X^C_n$ (representing cos $A_n$). Logic unit 190 also periodically receives values $X^C_n$ (representing cos $A_n$) and $X^C_{n-1}$ (representing cos $(A_n-B_n)$). Logic unit 190 generates an interim parameter value output $X^C_{A+B}$ (representing cos $(A_n+B_n)$) according to difference equation D1:

$$X^C_{A+B} = 2 \cos B_n X^C_n - X^C_{n-1}$$

Value $X^B_n$ is also applied as an input to a logic unit 192 in derivative next parameter iterating unit 176. Logic unit 192 receives initial values $X^S_{n-1}$ (representing sin $(A_n-B_n)$) and $X^S_n$ (representing sin $A_n$). Logic unit 192 also periodically receives values $X^S_n$ (representing sin $A_n$) and $X^S_{n-1}$ (representing sin $(A_n-B_n)$). Logic unit 192 generates a derivative interim parameter value $X^S_{A+B}$ (representing sin $(A_n+B_n)$) according to difference equation D2:

$$X^S_{A+B} = 2 \cos B_n X^S_n - X^S_{n-1}$$

Both the derivative interim parameter value $X^S_{A+B}$ and the interim parameter value $X^C_{A+B}$ are applied to a logic unit 194. Logic unit 194 receives inputs $V^C_\delta$ (representing cos $\delta$) and $V^S_\delta$ (representing sin $\delta$). Logic unit 194 generates a next parameter value $X^C_{n+1}$ (representing cos $A_{n+1}$) at an output 196, preferably according to combination equation C1. The next parameter value $X^C_{n+1}$ is fed back via a line 198 to a delay unit 200 and thence to a delay unit 202 to iteratively provide feedback values $X^C_{n-1}$ (representing cos $(A_n-B_n)$) and $X^C_n$ (representing cos $A_n$). Thus, next parameter value iterating unit iteratively generates interim parameter value $X^C_{A+B}$ and next parameter value $X^C_{n+1}$.

Derivative interim parameter value $X^S_{A+B}$ and interim parameter value $X^C_{A+B}$ are also applied to a logic unit 204. Logic unit 204 periodically receives values $V^C_\delta$ (representing cos $\delta$) and $V^S_\delta$ (representing sin $\delta$). Logic unit 204 generates a derivative next parameter value $X^S_{n+1}$ (representing sin $A_{n+1}$) preferably according to combination equation C2. The derivative next parameter value $X^S_{n+1}$ is fed back via a line 206 to a delay unit 208 and thence to a delay unit 210 to iteratively provide feedback values $X^S_{n-1}$ (representing sin $(A_n-B_n)$ and $X^S_n$ (representing sin $A_n$). Thus, derivative next parameter value iterating unit iteratively generates derivative interim parameter value $X^S_{A+B}$ and derivative next parameter value $X^S_{n+1}$.

A parametric determining unit 300 provides periodic inputs at update inputs 302, 304, 306, 308, 310 involving periodic supply of finite values as previously described in connection with FIG. 7.

It is to be understood that, while the detailed drawings and specific examples given describe preferred embodiments of the invention, they are for the purpose of illustration, that the apparatus and method of the invention are not limited to the precise details and conditions disclosed and that various changes may be made therein without departing from the spirit of the invention which is defined by the following claims.

We claim:

1. Apparatus for synthesizing a sinusoidal signal as a plurality of sample values taken at a plurality of sample times each separated by a sample interval, said sinusoidal signal being defined by at least one parameter which varies with respect to time, said parameter varying by a step value during a respective sample interval, the apparatus comprising:

a first difference equation implementer for iteratively treating an initial one of said step values to generate succeeding step values and a next step value as a function of a first difference equation, said next step value being said step value after a next-succeeding sample interval;

a second difference equation implementer for iteratively generating a next parameter value corresponding to said next succeeding sample interval, said second difference equation implementer being operatively connected with said first difference equation implementer for receiving succeeding step values from said first difference equation implementer, said second difference equation implementer iteratively generating succeeding interim parameter values;

a third difference equation implementer being operatively connected with said first difference equation implementer for receiving succeeding step values therefrom, said third difference equation implementer generating a corresponding plurality of derivative interim parameter values, each derivative interim parameter value being algorithmically related to a corresponding one of said interim parameter values; and a combiner coupled to said second and third difference equation implementers for respectively receiving successive interim parameter values and derivative interim parameter values therefrom, said combiner iteratively generating successive next parameter values each as a function of a current one of said interim parameter values and a current one of said derivative interim parameter values, said next parameter values used in defining said sinusoidal signal.

2. The apparatus of claim 1 wherein said parameter values are respective values of a sinusoidal function of a respective plurality of angular displacements of a phasor of said sinusoidal signal.

3. The apparatus of claim 1 wherein said step values are sinusoidal functions of estimates of respective differences in angular displacement of a phasor of said sinusoidal signal.

4. The apparatus of claim 1 wherein said interim parameter value is a sinusoidal function of an angular displacement of a current parameter value and an angular displacement of a current step value.

5. The apparatus of claim 1 wherein said derivative interim parameter value is a sinusoidal function of an angular displacement of a phasor of said sinusoidal signal and of an estimated difference in angular displacement of said phasor.

6. The apparatus of claim 1 wherein a change in estimated difference in angular displacement of a phasor of said sinusoidal signal is held constant throughout a plurality of adjacent sample intervals.

7. The apparatus of claim 1 wherein said step value is a function of a difference in angular displacement of a phasor representative of said sinusoidal signal.

8. The apparatus of claim 1 wherein each said derivative interim parameter value is the derivative of a corresponding one of said interim parameter values.

9. The apparatus of claim 1, wherein said second difference equation implementer is coupled to said combiner to receive said next parameter values, said second difference equation implementer deriving a current parameter value and a last parameter value from ones of said next parameter values, said second difference equation implementer generating a current one of said interim parameter values as a function of said current parameter value and said last parameter value.

10. The apparatus of claim 9, wherein a first delay unit of said second difference equation implementer is coupled to said combiner for receiving successive ones of said next parameter values, said first delay unit generating current parameter values in response to receiving respective ones of said next parameter values, a second delay unit of said second difference equation implementer coupled to said first delay unit for receiving said current parameter values, said second delay unit generating last parameter values responsive to receiving respective ones of said current parameter values.

11. The apparatus of claim 1, wherein a second combiner is coupled to said third difference equation implementer for receiving said derivative interim parameter values therefrom, said second combiner generating a plurality of successive next derivative parameter values responsive to receiving respective ones of said derivative interim parameter values;

said third difference equation implementer being coupled to said second combiner to receive said next derivative parameter values, said third difference equation implementer deriving a current derivative parameter value and a last derivative parameter value from ones of said next derivative parameter values, said third difference equation implementer generating a current one of said derivative interim parameter values as a function of said current derivative parameter value and said last derivative parameter value.

12. The apparatus of claim 11, wherein a first delay unit of said third difference equation implementer is coupled to said second combiner for receiving successive ones of said next derivative parameter values, said first delay unit generating current derivative parameter values in response to receiving respective ones of said next derivative parameter values, a second delay unit of said third difference equation implementer coupled to said first delay unit for receiving said current derivative parameter values, said second delay unit generating last derivative parameter values responsive to receiving respective ones of said current derivative parameter values.

13. The apparatus of claim 11, wherein said second combiner is coupled to said second difference equation implementer for receiving said interim parameter values, said second combiner generating said next derivative parameter values as a function of respective ones of said interim parameter values and said derivative interim parameter values.

14. The apparatus of claim 1, wherein said first difference equation implementer receives an initial step value and a function of an angular displacement increment used to calculate next step values, said second difference equation implementer receives an initial parameter value, and said third difference equation implementer receives an initial derivative parameter value, all of said initial values being received at the beginning of an analysis interval which includes a plurality of said sample intervals, said difference equation implementers receiving updated ones of said initial values at the beginning of subsequent analysis intervals.

15. Apparatus for generating a sinusoidal signal as a plurality of sample values at a plurality of sample times each separated by a sample interval, said sinusoidal signal being defined by at least one parameter which varies with respect to time, said parameter varying by a cosine step value during a respective sample interval, the apparatus comprising:

a first difference equation implementer for iteratively treating an initial cosine step value according to a first difference equation and for generating a plurality of cosine step values, a plurality of next ones of said cosine step values, one per sample interval, each being generated as a function of a last one of said cosine step values and a current one of said cosine step values;

a second difference equation implementer for iteratively generating a plurality of successive cosine interim parameter values, said second difference equation implementer coupled to said first difference equation implementer for receiving said cosine step values, ones of said cosine interim parameter values being generated as a function of respective ones of said step values;

a third difference equation implementer coupled to said first difference equation implementer for receiving said cosine step values and generating a plurality of derivative cosine interim parameter values, one per sample interval, ones of said derivative cosine interim parameter values being generated as a function of respective ones of said cosine step values; and a combiner coupled to said second difference equation implementer for receiving said cosine interim parameter values and coupled to said third difference equation implementer for receiving said derivative cosine interim parameter values, said combiner generating each of a plurality of next parameter values as a function of a respective current one of said cosine interim parameter values and a respective current one of said derivative cosine interim parameter values.

16. The apparatus of claim 15, wherein said first difference equation implementer generates said cosine step values according to the formula $$\cos B_{n+1} = 2 \cos \delta \cos B_n - \cos (B_n - \delta),$$

where n is the number of the current sample interval, $\cos B_n$ is the current cosine step value, $\cos B_{n+1}$ is the next cosine step value, and $\delta = B_n - B_{(n-1)}$.

17. The apparatus of claim 15, wherein said second difference equation implementer generates said cosine interim parameter values according to the formula $$\cos (A_n + B_n) = 2 \cos A_n \cos B_n - \cos (A_n - B_n),$$

where n is the number of the current sample interval, $\cos B_n$ is the current cosine step value, $A_n$ is a current cosine parameter value, $\cos (A_n - B_n)$ is a last cosine parameter value, and $\cos (A_n + B_n)$ is the next interim parameter value.

18. The apparatus of claim 15, wherein said third difference equation implementer generates said derivative cosine interim parameter values according to the formula $$\sin (A_n + B_n) = 2 \cos B_n \sin A_n - \sin (A_n - B_n),$$

where n is the number of the current sample interval, $\cos B_n$ is the current cosine step value, $\sin (A_n + B_n)$ is the next derivative cosine interim parameter value, $\sin A_n$ is a current derivative cosine parameter value, and $\sin (A_n - B_n)$ is a last derivative cosine parameter value.

19. The apparatus of claim 15, wherein said combiner generates said next parameter values according to the formula $$\cos A_{n+1} = \cos (A_n + B_n) \cos \delta - \sin (A_n + B_n) \sin \delta,$$

where $\cos A_{n+1}$ is the next cosine parameter value, $\cos (A_n + B_n)$ is the next cosine interim parameter value, n is the number of the current sample interval, $B_n$ is an estimated difference in angular displacement of a phasor of said sinusoidal signal, $\delta=B_n-B_{n-1}$, and $\sin(A_n+B_n)$ is the next derivative cosine interim parameter value.

20. A method for synthesizing a sinusoidal signal using automated apparatus as a plurality of sample values taken at a plurality of sample times each separated by a sample interval, said sinusoidal signal being defined by at least one parameter which varies with respect to time, a value of said parameter varying by a step value during a respective sample interval, the method comprising the steps of:

using a first difference equation implementer of the automated apparatus to iteratively treat an initial one of said step values according to a first difference equation to generate succeeding step values and a next step value, said next step value being said step value after a next-succeeding sample interval;

using a second difference equation implementer of the automated apparatus to iteratively generate succeeding ones of a plurality of interim parameter values according to a second difference equation as a function of respective ones of said step values;

using a third difference equation implementer of the automated apparatus to iteratively generate succeeding ones of a plurality of derivative interim parameter values according to a third difference equation as a function of respective ones of said step values; and using a combiner of the automated apparatus to generate a plurality of successive next parameter values representative of said sinusoidal signal each as a function of a current one of said interim parameter values and a current one of said derivative interim parameter values.

21. The method of claim 20 wherein said parameter is a sinusoidal function of an angular displacement of a phasor of said sinusoidal signal.

22. The method of claim 20 wherein said step value is a sinusoidal function of a difference in angular displacement of a phasor of said sinusoidal signal.

23. The method of claim 20 wherein said interim parameter value is an interim parameter sinusoidal value, said interim parameter sinusoidal value being a sinusoidal function of an angular displacement of a phasor of said sinusoidal signal and a difference in angular displacement of said phasor of said sinusoidal signal.

24. The method of claim 20 wherein said derivative interim parameter value is a derivative interim parameter sinusoidal value, said derivative interim parameter sinusoidal value being a sinusoidal function of an angular displacement of a phasor of said sinusoidal signal and a difference in angular displacement of said phasor of said sinusoidal signal.

25. The method of synthesizing a sinusoidal signal as recited in claim 20 wherein said step value is a sinusoidal function of an estimated difference in angular displacement of a phasor of said sinusoidal signal, a change in said difference being held constant during said intervals.

* * * * *